United States Patent [19]

Hayashida

[11] 3,991,861

[45] Nov. 16, 1976

[54] BRAKE SHOE CLEARANCE AUTOMATIC ADJUSTING DEVICE

[75] Inventor: Yoshihiro Hayashida, Chigasaki, Japan

[73] Assignee: Tokico Ltd., Japan

[22] Filed: July 11, 1975

[21] Appl. No.: 595,311

[30] Foreign Application Priority Data

July 17, 1974 Japan ............................... 49-81865

[52] U.S. Cl. ......................... 188/79.5 P; 188/106 A

[51] Int. Cl.[2] ........................................... F16D 65/54

[58] Field of Search.................. 188/79.5 P, 79.5 K, 188/6 E, 106 A, 106 F, 196 B

[56] References Cited

UNITED STATES PATENTS

| | | | |
|---|---|---|---|
| 1,940,022 | 12/1933 | Schnell | 188/106 A |
| 3,811,537 | 5/1974 | Margetts | 188/79.5 P |

*Primary Examiner*—Duane A. Reger
*Attorney, Agent, or Firm*—Wenderoth, Lind & Ponack

[57] ABSTRACT

An automatic brake shoe clearance adjusting device in a shoe drum brake having a pair of brake shoes. The device has a strut of adjustable length movably mounted between the shoes, one end of which connectively engages with one of the shoes, the other end of the strut engaging with the other of the shoes through one end of an L-shaped lever which is pivotally mounted on the strut, the other end of the lever being connected to manual brake actuating means, a spring urging the strut towards the other shoe which is associated with the lever, and a stop integrally mounted on the strut for controlling rotating movement of the lever relative to the strut.

5 Claims, 4 Drawing Figures

BRAKE SHOE CLEARANCE AUTOMATIC ADJUSTING DEVICE

This invention relates to an automatic brake shoe clearance adjusting device for a brake of a vehicle such as an automobile or the like.

In a brake of the shoe-drum type, it is occasionally required to adjust the clearance between the drum and the brake shoe since the brake is frequently used and causes wear of the lining. This adjustment may be manually made but requires a complex operation. For this reason, it has been desired to have the clearance automatically adjusted for reasons of convenience.

Various automatic adjusting devices have been heretofore proposed to fulfil such requirement.

One of the devices has one end of an adjusting lever (ratchet member) pivotally mounted on a web of one of the brake shoes, ratchet teeth being provided at one end of the adjusting lever, a pawl engageable with one of the ratchet teeth being pressed against the ratchet teeth, a strut being extended between two brake shoes, one end of the strut being engaged through a hand brake lever with the other brake shoe, the other end of the strut being movably mounted on the adjusting lever, the return position of the shoe being changed as the amount of shifting of the shoe when brake is applied increases.

A device of the aforementioned class is further designed so that a spring is extended between the other shoe and the strut for imparting rotational force to the hand brake lever which is designed to move the strut along with a back plate. The hand brake lever is provided with a stop against which the back plate abuts for controlling the range of rotation of the hand brake lever.

As a result, a frictional resistance is produced between the strut and the back plate when the brake shoe is returned to its inoperative position thereby, and the two brake shoes do not return by equal amounts. More specifically, one brake shoe is caused to return further than the other brake shoe. In a critical case, amount of backward movement of one brake shoe will become nil. Accordingly, there is a danger that one of the wheels of a vehicle may be maintained in a braked condition.

Thus, the present invention is provided to solve the aforementioned problems and is characterized in that a stop is provided in a strut and adapted to control the range of rotation of the hand brake lever.

More particularly, the present invention provides an automatic brake shoe clearance adjusting device for use in a shoe drum brake including a pair of arcuate brake shoes for frictionally engaging with the inner surface of a rotatable drum, which device comprises a strut of adjustable length movably mounted between the shoes, one end of the strut being connectively engaged with one of the shoes, the other of the shoes being connectively engaged with one end of an L-shaped lever which is pivotally mounted on the other end of the strut and the other end of the lever being connected to manual brake actuating means, a spring extending between the strut and the shoe associated with the lever so as to urge the strut and the lever toward the shoe, and a stop being integrally mounted on the strut for controlling the rotating movement of the lever relative to the strut.

Now, one embodiment of the present invention will be described with reference to the accompanying drawing, in which.

Figure 1:
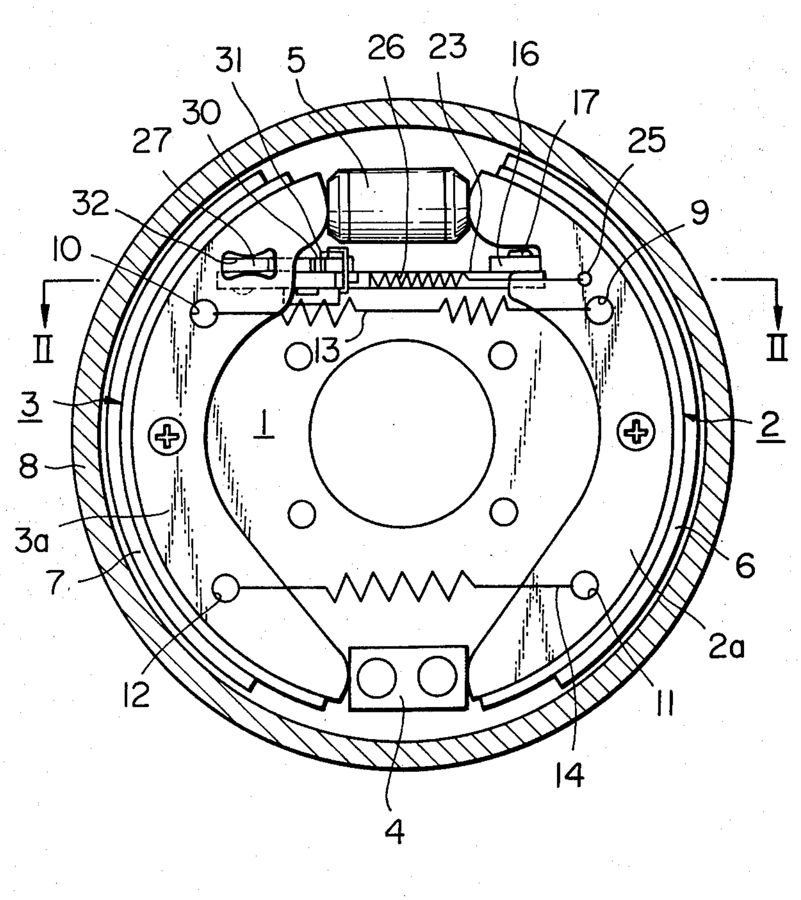
FIG. 1 is a plan view of a shoe drum type brake embodying the present invention.

In FIG. 1, numeral 1 designates a back plate which is secured to a stationary part of a vehicle such as a chassis. Two shoes 2 and 3 are oppositely mounted on the back plate 1 in a manner such that the lower end of each of shoes 2 and 3 abuts against an anchor 4 fixed to the back plate 1 and the upper end abuts against a wheel cylinder 5.

Linings 6 and 7 are bonded to these shoes 2 and 3, respectively, and the exterior surface abuts against a drum 8 rotatable with a wheel.

Webs 2*a* and 3*a* of the shoes 2 and 3 are provided with two pairs of openings 9 and 10 and 11 and 12 bored therethrough and between which two return springs 13 and 14 extend to draw the shoes 2 and 3 toward each other.

A strut 23 is disposed at a position between the return spring 13 and the wheel cylinder 5 for the shoes 2 and 3 and is adapted to effect a hand brake action and an shoe clearance adjustment.

The details of the arrangement will be explained with reference to FIG. 2.

The drum 8 is disposed adjacent the periphery of the back plate 1 and provided inwardly of the drum 8 are the shoes 2 and 3 to which the linings 6 and 7 are bonded. The shoes 2 and 3 are mounted for a reciprocal movement in the lateral directions in FIG. 2 and are adapted to effect a braking action when the wheel cylinder 5 (not shown in FIG. 2) is operated.

A generally L-shaped ratchet member 27 is rotatably pivoted by a pin 28 to the strut 23 and one or more teeth 27*a* provided on the outer periphery of the ratchet member 27 mesh with a pawl member 30 which is rotatably pivoted by a pin 29 to the strut 23 for preventing the ratchet member 27 from rotating in the clockwise direction.

The pawl member 30 is counterclockwisely urged by a spring 31 mounted on the strut 23 and a pawl portion thereof is adapted to normally mesh with one or more of the teeth 27*a* of the ratchet member 27.

A projection or an arm 27*b* formed on the ratchet member 27 is loosely received in a hole 32 bored through the shoe web 3*a* to leave a small clearance $\Delta x$.

A stop 27*c* is so formed at the top of the projection 27*b* as to bend perpendicular thereto. Numeral 33 denotes an opening bored through the back plate directly below the pawl member 30 which opening has therein a plug 34.

Figure 2:
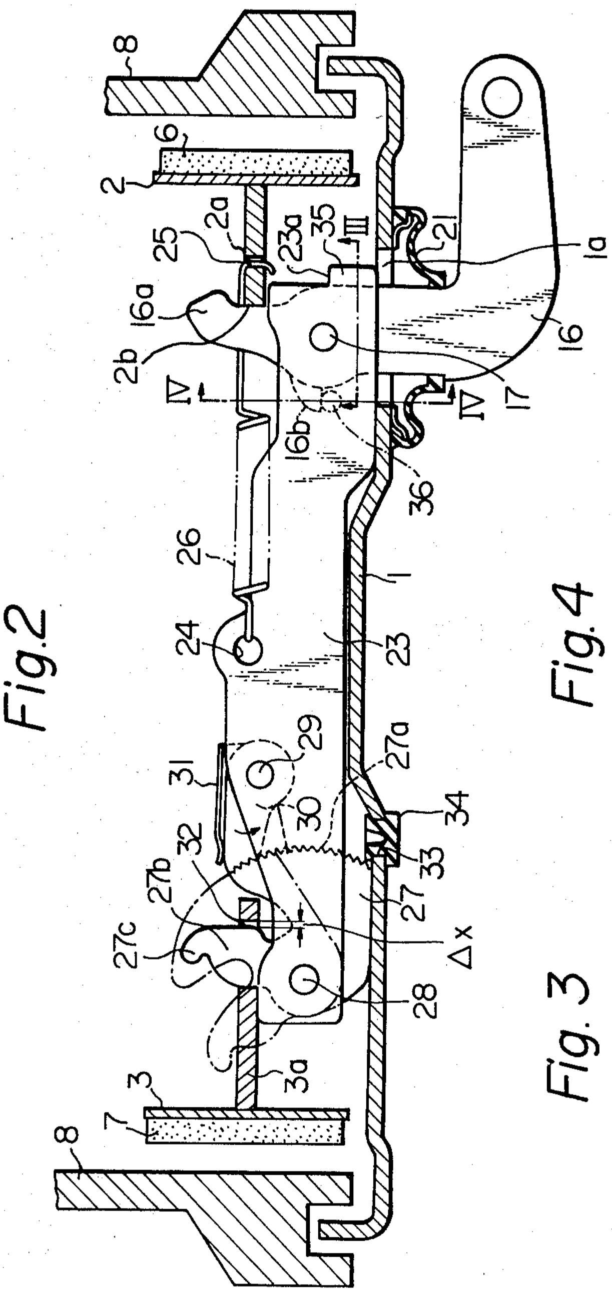
FIG. 2 is a section taken along line II—II of FIG. 1.

A generally L-shaped hand brake lever 16 which passes through an opening 1*a* in the back plate 1 is rotatably pivoted by a pin 17 to the strut 23 at the right end thereof in FIG. 2. One end portion 16*a* of the hand brake lever 16 abuts against an inside edge 2*b* of the shoe web 2*a*. An opening 24 is bored through a suitable portion of the strut 23. A tension spring 26 extends between the opening 24 and an opening 25 bored through the shoe web 2*a* whereby a counterclockwise rotational force is imparted to the hand brake lever 16 to allow the end portion 16$a$ to normally abut against the edge 2$b$ of the shoe web 2$a$. Numeral 21 is a duct cover for covering an opening 1$a$ formed in the back plate 1.

Figure 3:
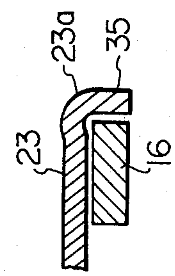
FIG. 3 is a section taken along line III—III of FIG. 2.

As shown in FIGS. 2 and 3, a stop 35 is formed at one end 23$a$ of the strut 23 by bending the end portion perpendicular relative to the lengthwise direction of the strut 23. When the hand brake lever 16 is rotated counterclockwise relative to the strut 23, it is forced to abut against the stop 35 so that the counterclockwise rotating movement of the lever 16 relative to the strut 23 is controlled.

Figure 4:
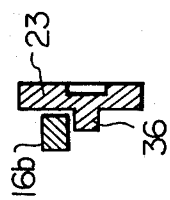
FIG. 4 is a section taken along line IV—IV of FIG. 2 but showing another embodiment different from that shown in FIG. 3.

Another embodiment of the present invention is shown in FIG. 4 wherein, instead of the stop being formed by bending the strut end 23$a$ as in the previous embodiment, a projection or a lug 16$b$ is formed on the hand brake lever 16 and a pin 36 acting as a stop which engages with the projection 16$b$ is secured on the strut 23, whereby the counterclockwise rotating movement of the hand brake lever 16 can be controlled. The positions of the pin 36 and the projection 16$b$ are shown by chain lines in FIG. 2.

According to the device constructed as above described, a driver actuates the brake to actuate wheel cylinders 5 to move the two shoes 2 and 3 in opposite lateral directions in FIG. 2 thus causing the linings 6 and 7 to abut against the inner periphery of the drum 8 for effecting braking action. It is noted that at this moment the ratchet member 27 is not rotated thus having no effect on the shoe clearance adjusting portion as long as the linings are not worn away and the amount corresponding to the relative displacement of the two shoes 2 and 3 is less than the clearance $\Delta x$ between the hole 32 and the ratchet member projection 27$b$ at a position where the hole 32 is bored through the shoe web 3$a$.

When the linings 6 and 7 have been worn out and the amount of shifting of the projection 27$b$ corresponding to the amount of shifting of the shoes when the brake is actuated, exceeds the value $\Delta x$, the ratchet projection 27$b$ will be engaged at its right side in FIG. 2 by the inner periphery of the hole 32 bored through the shoe web 3$a$ whereby the shoe 3 moving leftwards will rotate the ratchet member 27 counterclockwise as the strut 23 is pulled by the spring 26.

As above mentioned, one or more of the teeth 27$a$ formed at the periphery of the ratchet member 27 mesh with the pawl member 30 which has been counterclockwise urged by the spring 31, so that the pawl member 30 will be caused to slip off the ratchet member incrementally at the rate of one tooth at a time and the ratchet member 27 will be rotated counterclockwise thereby increasing the effective length of the strut assembly.

Release of the brake pedal by the driver reduces fluid pressure in the wheel cylinder 5 to allow the returning forces of the return springs 13 and 14 to return the shoes in the directions toward each other. It is noted that at this moment the shoes may be returned to positions where the ratchet member projection 27$b$ is engaged at the other side thereof (on the left hand side in FIG. 2) with the inner periphery of the hole 32 bored through the shoe web 3$a$. In this connection, this position is such a position as would be determined by an amount the linings 6, 7 are worn away (exactly stated, by the number of ratchet teeth approximate to the aforementioned amount) from the initial position, namely, the returned or inactive position of the shoe when the lining has not been worn away. Consequently, an undesirable clearance which may be produced between the linings 6 and 7 and the periphery of the drum 8 due to wear of the linings can be automatically compensated to render the clearance above a predetermined amount substantially zero.

In FIG. 2, the position of the ratchet member 27 shown by the solid line is its initial position whereas the position shown by the chain line defines the maximum automatically adjustable position where the linings 6 and 7 are worn away. It is understood that the ratchet member projection 27$b$ is formed into the stop 27$c$ for the purpose of preventing the ratchet member 27 from further rotating when the latter is rotated to assume the chain line position as shown. The ratchet member 27 is not rotated by actuation of the brake when brought to such position but moves bodily with the strut 23 and the lever 16 leftwards, as shown, against tension of the spring 26 thereby effecting no adjusting action. The driver may readily realize when the linings need to be replaced by new ones from the fact that the brake pedal has to be worked to a considerable extent when the linings 6 and 7 have been worn away further from the maximum automatic clearance adjusted condition.

The shoes 2 and 3 may be readily returned to their initial positions by inserting a screwdriver or the like through the opening 33 in the back plate 1 to disengage the pawl member 30 from the tooth 27$a$ of the ratchet member 27, as required.

According to the present invention as described hereinbefore, the strut 23 is provided with the stop 35 for controlling the counterclockwise rotating range of the hand brake lever 16 to equalize the amounts of returning movements of the shoes 2 and 3 without frictional resistance between the strut 23 or the hand brake lever 16 and the back plate 1 as opposed to what has been heretofore proposed thereby obviating the danger that one of the shoes is not returned thereby maintaining one wheel in a braked condition for causing wheel drag. Integration of the stop 35 and the strut 23 reduces the number of parts and makes the structure less expensive.

I claim:

1. An automatic brake shoe clearance adjusting device for use in a shoe drum brake having a back plate and a pair of arcuate brake shoes for frictionally engaging with inner surface of a rotatable drum, and comprising a strut of adjustable length movably mounted between the brake shoes, one end of which operatively engages with one of the brake shoes with a predetermined clearance in the brake applying direction, a lever pivoted on the other end of said strut and which engages with the other one of the shoes, said lever being adapted to be actuated by manual brake actuating means, a spring connected to said strut for urging the strut toward said the other brake shoe, and a stop on said strut for abutting the lever for limiting the rotation of said lever on said strut in the direction of the non-actuated position of said lever to determine a non-actuated position of the lever relative to the strut.

2. An automatic brake shoe clearance adjusting device according to claim 1, in which said lever is generally L-shaped, one arm engaging the radially inner end of the web of said the other brake shoe and the other arm protruding outwardly through the back plate of the brake for connection with a manual brake actuating means.

3. An automatic brake shoe clearance adjusting device according to claim 1, in which said strut comprises a generally L-shaped ratchet member one of the arms of which extends through an opening formed in the web of said one brake shoe with a predetermined clearance therebetween, the other of the arms of which has ratchet teeth on the outer periphery thereof, and a generally plate-like strut member on which said ratchet member is pivotally mounted and said strut member extending towards said the other brake shoe.

4. An automatic brake shoe clearance adjusting device, as claimed in claim 1, in which said stop comprises a pin on said strut and projecting perpendicularly relative to the lengthwise direction of the strut and a lug is provided on said lever which is engagable with said pin to establish the non-actuated or normal rest position of the lever with respect to the strut.

5. An automatic brake shoe clearance adjusting device as claimed in claim 1, in which said strut is a generally plate-like member, one end portion of which is bent perpendicular with respect to the plane of said member to form said stop.

* * * * *